2,697,088

ACRYLONITRILE POLYMER MIXED WITH FORMYLATED POLYVINYL ALCOHOL

Theodore E. Stanin and Joseph B. Dickey, Kingsport, Tenn., assignors to Eastman Kodak Company, Rochester, N. Y., a corporation of New Jersey No Drawing. Application June 27, 1951, Serial No. 233,931

5 Claims. (Cl. 260—32.6)

This invention relates to polymer compositions and to articles prepared therefrom.

The instant application is a continuation-in-part of our application Serial No. 151,808, filed March 24, 1950, now U. S. Patent 2,558,793, issued July 3, 1951.

Acrylonitrile has previously been used in the preparation of various polymers which are characterized by insolubility, or very low solubility, in many of the usual organic solvents. Many of these polymers, especially those containing high percentages of acrylonitrile, are further characterized by their lack of susceptibility to organic dyes, it being well known that fibers spun from polyacrylonitrile solutions can be passed through dye baths without material amounts of the dye adhering to the fiber.

Attempts have been made to increase the dyeability of polyacrylonitrile fibers by interpolymerizing acrylonitrile with certain monomers whose polymers have an affinity for dyes. While this procedure does give polymer products from which fibers having good dyeing properties can be obtained, a serious drawback arises in many instances due to a substantial lowering of the softening point of the fiber. For example, while an interpolymer of acrylonitrile and vinyl formate containing large amounts of acrylonitrile in the polymer molecule can be drawn into fibers readily susceptible to dyes, the softening point of such fibers is too low for practical purposes, softening of the fibers being observed at temperatures of about 150° C. Interpolymers of acrylonitrile and vinyl formate have previously been suggested in Billig U. S. Patent 2,317,725, dated April 27, 1943. However, fibers prepared from the polymer compositions shown in this reference are too low in their softening temperature to be of practical use.

Other attempts have been made to increase the dyeability of polyacrylonitrile fibers by mixing with the polyacrylonitrile, before spinning, other polymeric materials which are dye-susceptible. This procedure likewise provides fibers having good dyeing properties. However, many of these fibers show a low softening point, and in addition many show segmentation into their individual components along their horizontal axis. For example, it can be demonstrated that mixtures of polyvinyl acetate and polyacrylonitrile, when dissolved in either N,N-dimethylformamide or N,N-dimethylacetamide in proportions varying from 15 to 50 per cent by weight of polyvinyl acetate based on the total weight of the mixed polyacrylonitrile and polyvinyl acetate, form grainy dopes which separate into two liquid layers on standing. This is also true of many other polymeric compounds, natural or synthetic, which are soluble in the above solvents. Fibers which form from these non-homogeneous solutions or mixtures of polyacrylonitrile and polyvinyl acetate are too low in softening temperature to be of practical value, and also are subject to the defect of segmentation. This is not surprising because of the non-homogeneous condition of the spinning solution and the fact that it is generally known that polyacrylonitrile is not compatible with many organic substances.

We have now made the unusual and valuable discovery that certain mixtures of polyacrylonitrile form stable solutions which do not separate into distinct layers on standing, and from which fibers of homogeneous character can be spun. These fibers are characterized by a softening point higher than the interpolymers referred to above, and do not exhibit the segmentation defect shown by many of the fibers prepared from certain prior art mixtures comprising polyacrylonitrile.

It is, therefore, an object of our invention to provide polymer mixtures comprising polyacrylonitrile. A further object is to provide homogeneous solutions of these polymer mixtures comprising polyacrylonitrile. Still another object is to provide fibers obtained from these homogeneous solutions of these polymer mixtures. Other objects will become apparent from a consideration of the following description and examples.

According to our invention, we provide polymer mixtures comprising from 60 to 90 per cent by weight of polyacrylonitrile and from 40 to 10 per cent by weight of formylated polyvinyl alcohol.

The formylated polyvinyl alcohol useful in practicing our invention can advantageously be obtained by partially esterifying polyvinyl alcohol with formic acid to give a product containing from about 20 to 37 per cent by weight of formyl

The formic acid can be diluted with water to control the amount of formylation. There appears to be an equilibrium between the extent of formylation and the amount of water present in the acid, since a plot of the strength (percent) of formic acid versus the percent formyl in the resulting polymer forms a fairly good straight line. Thus by appropriately varying the strength of formic acid, one can prepare a formylated polyvinyl alcohol of predetermined constitution. The following table shows the linear increase of percent formyl with increasing strength of the formic acid.

TABLE

| Percent by Weight Formic Acid | Percent by Weight Formyl |
|---|---|
| 50 | 14.1 |
| 62.5 | 20.2 |
| 65 | 21.5 |
| 70 | 23.5 |
| 75 | 25.5 |
| 77.5 | 27.5 |
| 80 | 29.0 |
| 82.5 | 29.5 |
| 85 | 30.5 |
| 90 | 31.9 |
| 97.5 | 36.2 |
| 100 | 37.0 |

The above esterifications are performed in the absence of a mineral acid, or strong organic acid, esterifying agent, and formylation is never 100 per cent complete. In the event such an esterifying agent is employed, the formylation can be accelerated, and when employing 100 per cent formic acid in the presence of a strongly acid esterification catalyst, e. g. chloroacetic acid, it is possible to obtain essentially complete formylation as shown in our copending application Serial No. 151,808.

The polymer mixtures of our invention comprising polyacrylonitrile and formylated polyvinyl alcohol can be dissolved in solvents, such as N,N-dimethylformamide and N,N-dimethylacetamide to form stable solutions which do not show any marked tendency to separate. The lack of graininess in these solutions permits smooth, trouble-free extrusion through jets in the spinning of fibers, and permits storage of these solutions prior to spinning without troublesome separations of the solutions into two distinct layers. Especially useful compositions comprise those containing from 65 to 80 per cent by weight of polyacrylonitrile and from 35 to 20 per cent by weight of the formylated polyvinyl alcohol. These compositions provide fibers which can be deeply dyed with acetate, viscose, acid, and basic dyes. The tenacity of the fibers obtained from mixtures measures between 2.0 and 4.5 grams per denier depending on the spinning, drafting, and shrinking conditions, and the elongation is 16 to 25 per cent at break depending upon the shrinking conditions. The sticking temperatures of the fibers obtained from these mixtures, as measured on a hot bar, lie around 200° C., and moisture absorption is 3 to 5 per cent at 60 per cent relative humidity, depending upon the amount of formylated polyvinyl alcohol used in the mixture, and the per cent formyl in the polymer.

The polyacrylonitrile and formylated polyvinyl alcohol resins can be mixed by any of several methods. The two ingredients can be mixed together in a suitable mixer, such as a ball mill or Banbury mixer, or they can be dissolved in a mutual solvent (which is known to dissolve polyacrylonitrile), such as N,N-dimethylformamide, N,N-dimethylacetamide, ethylene carbonate, ethylene carbamate, N-methyl-2-pyrrolidone, γ-butyrolactone, etc. The ingredients can be mixed together before addition to the solvent, or each ingredient can be added separately to the solvent. Again, the ingredients can be added to the solvent to produce a slurry or dispersion which is agitated and heated to effect solution. The solubility of the resins in the solvents can be improved by incorporating a small amount of certain acids, such as sulfuric acid, phosphoric acid, oxalic acid, etc. as has been described in U. S. Patent 2,503,244, issued April 11, 1950, and U. S. Patent 2,503,245, issued April 11, 1950, of H. W. Coover, Jr., T. E. Stanin and J. B. Dickey. The concentration of solids in the solvents can be varied depending on the use to which the composition is to be put; however, for most purposes it has been found that from about 10 to 40 per cent by weight of solids is adequate.

The following examples will serve to illustrate further the manner whereby we practice our invention.

*Example 1*

20 g. of polyvinyl alcohol were dissolved by tumbling in dry formic acid (dried by distilling over phthalic anhydride) at room temperature. The resulting solution was allowed to stand for 16 hours and then added gradually from a dropping funnel to 500 cc. of cold water stirred in a beaker. The precipitated polymer was collected on a filter, thoroughly washed with a solution of sodium bicarbonate, followed by a water-wash, filtered and dried. There were thus obtained 28 g. of formylated polyvinyl alcohol containing 37% by weight of formyl.

*Example 2*

10 g. of the polymer obtained in Example 1, were dissolved in 500 cc. of N,N-dimethylformamide containing 2 g. of phosphorus pentoxide. The solution was chilled to 0° C. and 40 g. of finely powdered polyacrylonitrile (inherent viscosity 2.31) were added with stirring. The resulting slurry was slowly heated to 90° C. to give a smooth, almost color-free, viscous solution. This solution was filtered under pressure and then spun through a 52-hole spinnerette into a bath containing isopropyl alcohol. The coagulated filaments were dried by passing over a pair of delay rolls contained in an air chamber heated to 140° C. The yarn was then drafted 700% by passage through an air chamber heated to 140° C., and then shrunk 20% in a steam chamber at 120° C. The yarn was wound on a spool by means of a cap spinner adjusted to impart a twist of three turns per square inch. The yarn thus obtained had a tenacity of 3.0 grams per denier, an elongation of 15% at break, and a bar sticking temperature of 220 to 225° C. It was deeply dyed by acetate, direct, acid and basic dyes.

*Example 3*

2 g. of polyvinyl alcohol were dissolved by tumbling in 10 cc. of 90% by weight of formic acid heated to 23° C. The solution was tumbled for 16 hours and then precipitated as described in Example 1 above. The precipitated polymer was washed with water and then dried. The dried polymer weighed 2.2 g. and contained 31.9% by weight of formyl.

0.3 g. of the formylated polyvinyl alcohol thus obtained and 1.7 g. of polyacrylonitrile were dissolved in N,N-dimethylformamide as described in Example 2 above. The resulting solution was then spun through a single filament spinnerette into a coagulating bath of isopropyl alcohol. The filament was drafted 700% in a hot air chamber heated to 140° C. and then wound on a drum in bundles of approximately 50 filaments, removed and twisted into lengths of yarn 1-meter long. This yarn had a tenacity of 2.6 grams per denier and an elongation of 22% after shrinking 9.6% in boiling water. The yarn dyed well with acetate, direct and acid and basic dyes, though not quite as deeply as the yarn of Example 2.

By replacing the formylated polyvinyl alcohol used in the above example by an equimolar amount of formylated polyvinyl alcohol containing 20.2% by weight of formyl, a polymer mixture can be obtained which is useful in the preparation of synthetic yarns according to the method described above.

*Example 4*

2 g. of polyvinyl alcohol were dissolved by tumbling in 10 cc. of 77.5% by weight of formic acid heated to 23° C. The solution was then tumbled for 16 hours and the polymer separated as described in Example 1 above. It weighed 2.3 g. and contained 27.5% by weight of formyl.

0.96 g. of the formylated polyvinyl alcohol obtained above and 1.44 g. of polyacrylonitrile were dissolved in 10 cc. of N,N-dimethylformamide containing 50 mg. of phosphorus pentoxide according to the method described in Example 2 above. The resulting solution was then extruded into fibers according to the method described in Example 3 above. This yarn had a tenacity of 2.0 grams per denier and elongation of 23% at break, and a bar-sticking temperature of 180–190° C. It was deeply dyed by acetate, direct, acid, and basic dyes.

In lieu of directly mixing the formylated polyvinyl alcohol with polyacrylonitrile as described in the above examples, we have found that useful polymer compositions can also be obtained by polymerizing the acrylonitrile in the presence of the formylated polyvinyl alcohol. This general method is described in the following example.

*Example 5*

20 g. of polyvinyl alcohol (low-viscosity) were dissolved in 100 cc. of 50% by weight formic acid, and the solution was tumbled overnight at 23° C. The polymer was isolated by precipitating the acid solution in acetone, filtered, and then dried in a vacuum-oven heated to 50° C. The polymer weighed 21 g. and contained 14.1% by weight of formyl.

9 g. of the formylated polyvinyl alcohol obtained above were dissolved in 200 cc. of water and 21 g. of acrylonitrile were added. The mixture was shaken well and 0.4 g. of dodecyl mercaptan, 0.4 g. of ammonium persulfate and 0.4 g. of sodium bisulfite were then added. The vessel was stoppered, shaken well, and allowed to stand overnight. The polymer which separated from solution was filtered, washed with water and dried. The inherent viscosity as determined in a 0.25% solution in N,N-dimethylformamide was 1.6. The yield of polymer was 27 g. and it contained 79% by weight of acrylonitrile by nitrogen analysis.

3 g. of the acrylonitrile-formylated polyvinyl alcohol polymer thus obtained were dissolved in 20 cc. of N,N-dimethylformamide, and the solution spun into fibers according to the method described in Example 3 above. The yarn samples had a tenacity of 3.8 grams per denier and extensibility of 22%, and a bar-sticking temperature of 240° C. It dyed well with vat, basic, acid, and direct dyes, but not as well with acetate dyes as the fibers obtained in Examples 2–4.

Although the above examples disclose a spinning procedure wherein the polymer solution is spun into a liquid medium, it is also possible to obtain fibers of excellent physical properties by extruding the heated solutions into heated air, steam, or other gaseous media.

The polyacrylonitrile useful in practicing our invention can be prepared according to the process described in U. S. Patent 2,434,054, dated January 6, 1948, or U. S. Patent 2,296,403, dated September 22, 1942. Other processes which can be used are described in the co-pending applications, Serial No. 49,651 (now U. S. Patent 2,629,711), issued February 24, 1953), Serial No. 49,652 (now U. S. Patent 2,629,712, issued February 24, 1953), and Serial No. 49,653 (now abandoned), all filed September 16, 1948, of T. E. Stanin, H. W. Coover, Jr., and J. B. Dickey.

Instead of using the homopolymer of acrylonitrile as described above, interpolymers of acrylonitrile containing a predominating amount of acrylonitrile can be used, if desired. The polymer described above and those set forth in the following claims are to be understood as including not only 100 per cent acrylonitrile, but also interpolymers containing a predominating amount of acrylonitrile. Such interpolymers should generally not contain more than about 5 per cent of another vinyl monomer, since amounts greater than this figure may cause alteration in the properties of the interpolymers, giving products which differ substantially from the properties of polyacroylonitrile—100 per cent acrylonitrile. Interpolymers containing not more than about 5 per cent of a different, modifying vinyl monomer have properties which are generally quite similar to those of polyacrylonitrile—100 per cent acrylonitrile. Interpolymers of acrylonitrile containing about 5 per cent of some modifier, such as vinyl acetate, vinyl formate, methyl acrylate, styrene, isopropenyl acetate, methyl α-methacrylate, acrylamide, alkyl α-acetaminoacrylates (e. g. methyl α-acetaminoacrylate, etc.), etc. can be used.

The polyvinyl alcohol to be formylated can be obtained by known methods. Such polyvinyl alcohol contains a negligible amount of acetyl (2 per cent or less) which cannot be removed by hydrolysis. Polyvinyl alcohol is a commercially available product, and such polyvinyl alcohol can be used in formylations according to the above-described method.

In the preparation of the polymer mixtures of our invention an amount of formylated polyvinyl alcohol less than about 10 per cent by weight, based on the total weight of the mixture of polyacrylonitrile and formylated polyvinyl alcohol, should not be used, since amounts lower than this figure provide mixtures from which fibers, which are not sufficiently susceptible to dyeing, are formed. On the other hand, mixtures containing more than about 40 per cent by weight of formylated polyvinyl alcohol provide fibers which lose substantial amounts of the formylated polyvinyl alcohol in washing. Both of these defects are avoided in the compositions of our invention described herein and those set forth in the claims appended hereto.

The formylated polyvinyl alcohol and polyacrylonitrile mixtures of our invention are also useful in the preparation of sheets, films, tapes, etc.

What we claim as our invention and desire secured by Letters Patent of the United States is:

1. A solution of a resinous composition comprising from 60 to 90 per cent by weight of polyacrylonitrile and from 40 to 10 per cent by weight of formylated polyvinyl alcohol containing from 20 to 37 percent by weight of formyl, in a solvent selected from the group consisting of N,N-dimethylformamide, N,N-dimethylacetamide, ethylene carbonate, ethylene cabamate, N-methyl-2-pyrrolidone, and γ-butyrolactone.

2. A solution of a resinous composition comprising from 60 to 90 per cent by weight of polyacrylonitrile and from 40 to 10 per cent by weight of formylated polyvinyl alcohol containing from 20 to 37 percent by weight of formyl, in N,N-dimethylformamide.

3. A solution of a resinous composition comprising from 60 to 90 per cent by weight of polyacrylonitrile and from 40 to 10 per cent by weight of formylated polyvinyl alcohol containing 37 percent by weight of formyl, in N,N-dimethylformamide.

4. A solution of a resinous composition comprising from 60 to 90 per cent by weight of polyacrylonitrile and from 40 to 10 per cent by weight of formylated polyvinyl alcohol containing 31.9 percent by weight of formyl, in N,N-dimethylformamide.

5. A solution of a resinous composition comprising from 60 to 90 per cent by weight of polyacrylonitrile and from 40 to 10 per cent by weight of formylated polyvinyl alcohol containing 27.5 percent by weight of formyl, in N,N-dimethylformamide.

References Cited in the file of this patent
UNITED STATES PATENTS

| Number | Name | Date |
|---|---|---|
| 2,558,793 | Stanin et al. | July 3, 1951 |